United States Patent
Schilling

(10) Patent No.: US 7,547,194 B2
(45) Date of Patent: Jun. 16, 2009

(54) ROTOR BLADE AND METHOD OF FABRICATING THE SAME

(75) Inventor: Jan Christopher Schilling, Middletown, OH (US)

(73) Assignee: General Electric Company, Schenectady, NY (US)

( * ) Notice: Subject to any disclaimer, the term of this patent is extended or adjusted under 35 U.S.C. 154(b) by 446 days.

(21) Appl. No.: 11/461,014

(22) Filed: Jul. 31, 2006

(65) Prior Publication Data

US 2009/0053070 A1    Feb. 26, 2009

(51) Int. Cl.
*F01D 5/14* (2006.01)

(52) U.S. Cl. ............... 416/230; 416/229 A; 416/241 A; 29/889.71

(58) Field of Classification Search ............. 416/229 A, 416/230, 227, 241 R, 241 A; 29/889.71
See application file for complete search history.

(56) References Cited

U.S. PATENT DOCUMENTS

| | | | |
|---|---|---|---|
| 3,883,267 A | 5/1975 | Baudier et al. | |
| 4,118,147 A | * 10/1978 | Ellis | ............................ 416/230 |
| 4,685,864 A | 8/1987 | Angus et al. | |
| 4,808,076 A | 2/1989 | Jarmon et al. | |
| 5,096,384 A | * 3/1992 | Immell et al. | ........... 416/229 R |
| 5,222,297 A | 6/1993 | Graff et al. | |
| 5,279,892 A | 1/1994 | Baldwin et al. | |
| 5,308,228 A | 5/1994 | Benoit et al. | |
| 5,634,771 A | * 6/1997 | Howard et al. | .......... 416/241 A |
| 5,921,754 A | 7/1999 | Freitas et al. | |
| 7,008,689 B2 | 3/2006 | Hawkins et al. | |

* cited by examiner

*Primary Examiner*—Ninh H Nguyen
(74) *Attorney, Agent, or Firm*—William Scott Andes, Esq.; Armstrong Teasdale LLP

(57) ABSTRACT

A method for fabricating a rotor blade includes fabricating a rotor blade that includes a dovetail and an airfoil coupled to the dovetail, the airfoil including a first side, a second side, and a plurality of openings extending therethrough, and weaving a composite material through the openings such that the airfoil has an aerodynamic profile that is substantially smooth from an airfoil leading edge to an airfoil trailing edge.

20 Claims, 9 Drawing Sheets

US 7,547,194 B2

ROTOR BLADE AND METHOD OF FABRICATING THE SAME

BACKGROUND OF THE INVENTION

This invention relates generally to gas turbine engines, and more particularly, to a gas turbine engine rotor blade and a method of fabricating the same.

Gas turbine engines typically include high and low pressure compressors, a combustor, and at least one turbine. The compressors compress air which is mixed with fuel and channeled to the combustor. The mixture is then ignited for generating hot combustion gases, and the combustion gases are channeled to the turbine which extracts energy from the combustion gases for powering the compressor, as well as producing useful work to propel an aircraft in flight or to power a load, such as an electrical generator.

At least one known gas turbine fan assembly includes a plurality of rotor blades each having an airfoil that is fabricated utilizing a metallic material, such as titanium for example, and a composite material that is bonded to the surface of the airfoil. More specifically, the known airfoil is fabricated such that the composite material is laid up as individual unidirectional plies of material on the surface of the airfoil. However, for relatively small airfoils the titanium may become quite large and thus dominate the structural load path. As such, instead of the composite carrying the titanium, the titanium is carrying the composite.

Moreover, when the gas turbine engine operates in various conditions, foreign objects may be ingested into the engine. More specifically, if a foreign object strikes the airfoil, since the composite material is only bonded to the external surface of the airfoil, a portion of the composite material may be liberated from the airfoil and thus enter the engine flow path resulting in further foreign object damage to the gas turbine engine.

BRIEF SUMMARY OF THE INVENTION

In one aspect, a method for fabricating a rotor blade is provided. The method includes fabricating a rotor blade that includes a dovetail and an airfoil coupled to the dovetail, the airfoil including a first side, a second side, and a plurality of openings extending therethrough, and weaving a composite material through the openings such that the airfoil has an aerodynamic profile that is substantially smooth from an airfoil leading edge to an airfoil trailing edge.

In another aspect, a rotor blade for a gas turbine engine is provided. The rotor blade includes a dovetail, an airfoil coupled to the dovetail, the airfoil including a first side, a second side, and a plurality of openings extending therethrough, and a composite material woven through the openings such that the airfoil has an aerodynamic profile that is substantially smooth from an airfoil leading edge to an airfoil trailing edge.

In a further aspect, a gas turbine engine assembly is provided. The gas turbine engine assembly includes a fan rotor disk, and a plurality of fan blades coupled to the fan rotor disk, at least some of the fan blades including a dovetail, an airfoil coupled to the dovetail, the airfoil including a first side, a second side, and a plurality of openings extending therethrough, and a composite material woven through the openings such that the airfoil has an aerodynamic profile that is substantially smooth from an airfoil leading edge to an airfoil trailing edge.

DETAILED DESCRIPTION OF THE INVENTION

Figure 1:
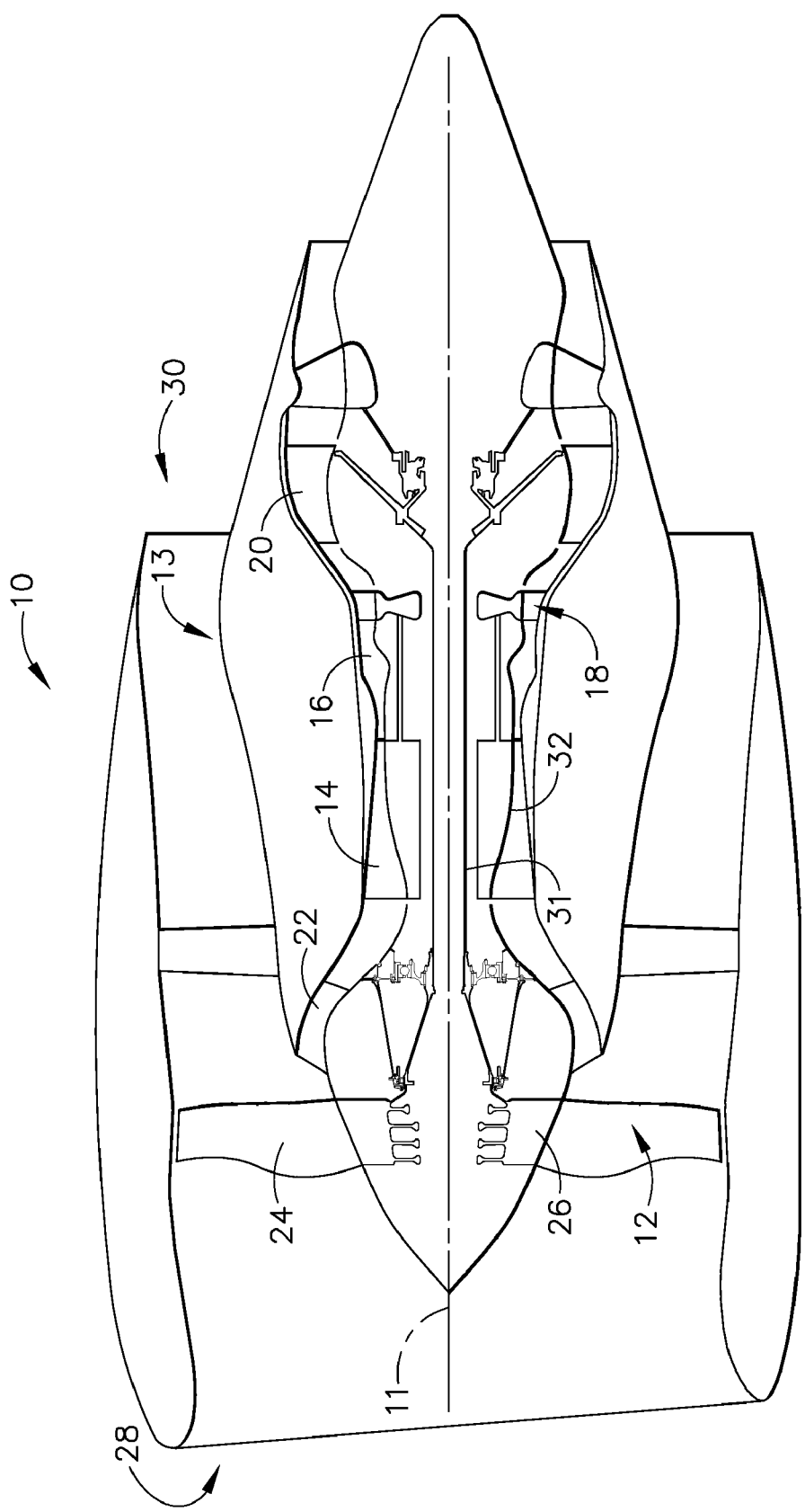
FIG. 1 is a schematic illustration of an exemplary gas turbine engine.

FIG. 1 is a schematic illustration of an exemplary gas turbine engine assembly 10 having a longitudinal axis 11. Gas turbine engine assembly 10 includes a fan assembly 12, and a core gas turbine engine 13 that includes a high pressure compressor 14, a combustor 16, and a high pressure turbine 18. In the exemplary embodiment, gas turbine engine assembly 10 also includes a low pressure turbine 20 and a multi-stage booster compressor 22.

Fan assembly 12 includes an array of fan blades 24 extending radially outward from a rotor disk 26. Engine 10 has an intake side 28 and an exhaust side 30. In the exemplary embodiment, gas turbine engine 10 is a GE90 gas turbine engine that is available from General Electric Company, Cincinnati, Ohio. Fan assembly 12, booster 22, and low-pressure turbine 20 are coupled together by a first rotor shaft 31, and compressor 14 and high-pressure turbine 18 are coupled together by a second rotor shaft 32.

In operation, air flows through fan assembly 12 and compressed air is supplied to high pressure compressor 14 through booster 22. The booster discharge air is channeled to compressor 14 wherein the airflow is further compressed and delivered to combustor 16. Hot products of combustion (not shown in FIG. 1) from combustor 16 are utilized to drive turbines 18 and 20, and turbine 20 is utilized to drive fan assembly 12 and booster 22 by way of shaft 31. Engine 10 is operable at a range of operating conditions between design operating conditions and off-design operating conditions.

Figure 2:
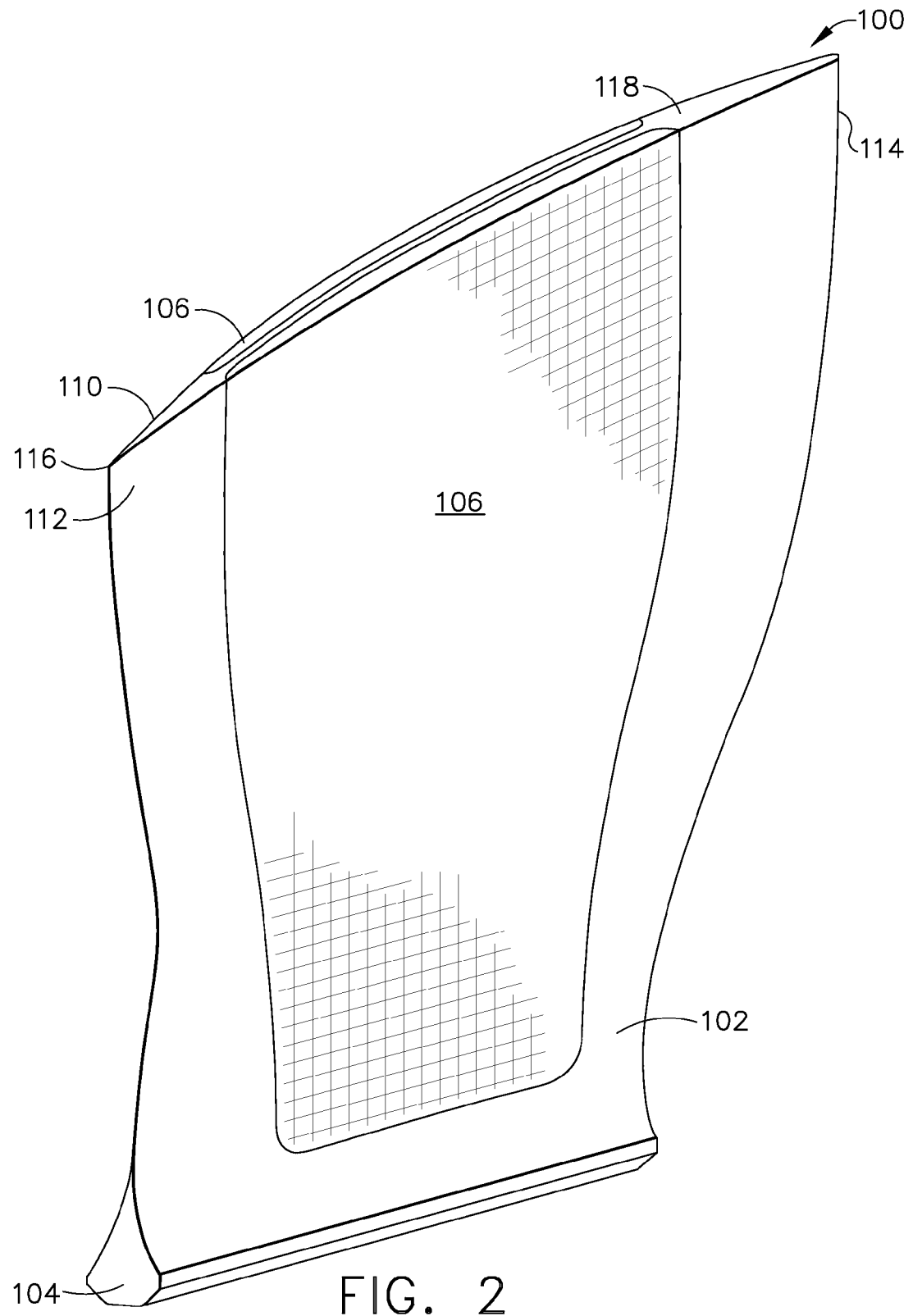
FIG. 2 is a perspective view of a rotor blade that includes a composite portion that may be utilized with the gas turbine engine shown in FIG. 1.
Figure 3:
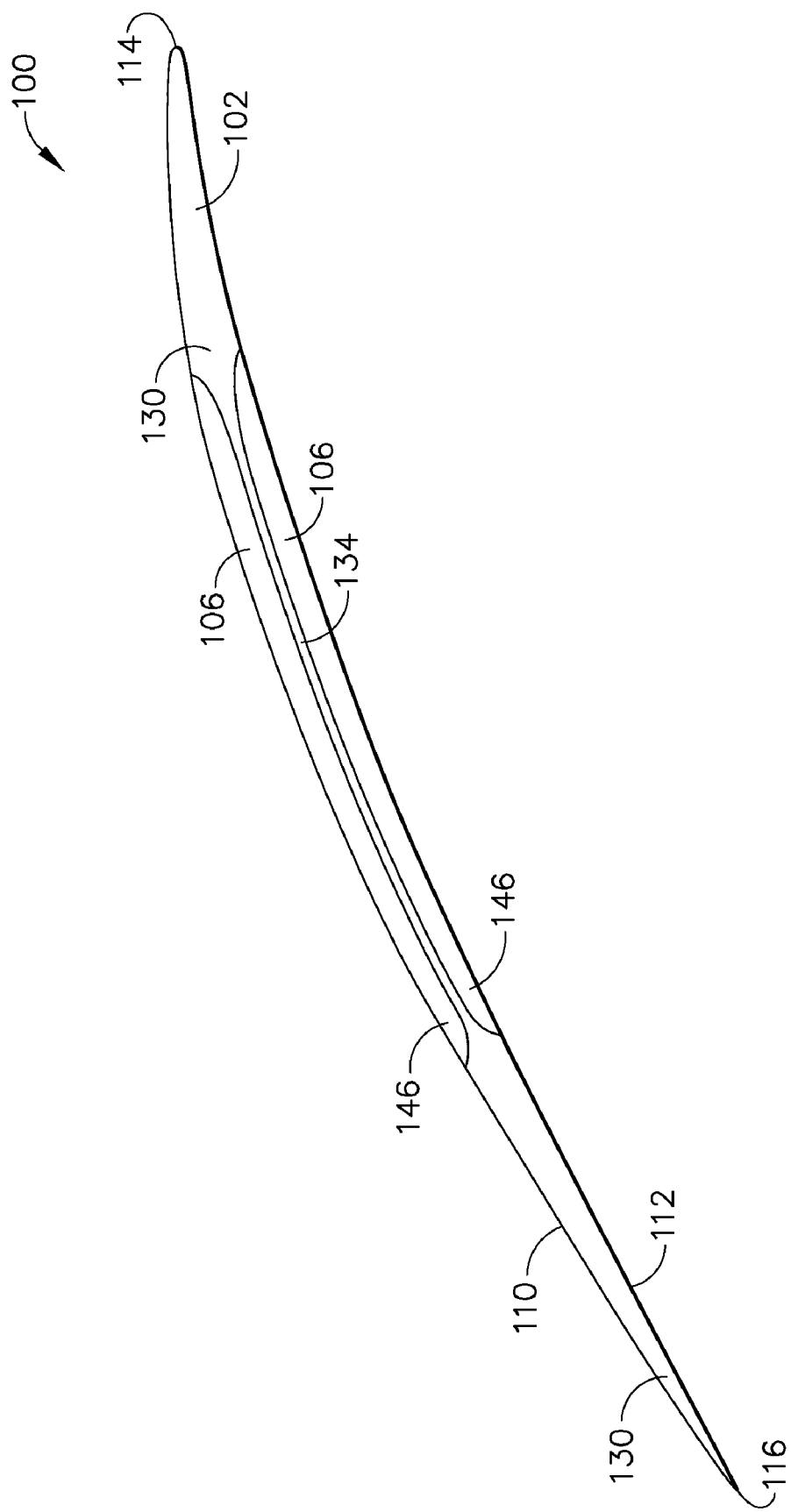
FIG. 3 is a top view of the rotor blade shown in FIG. 2.
Figure 4:
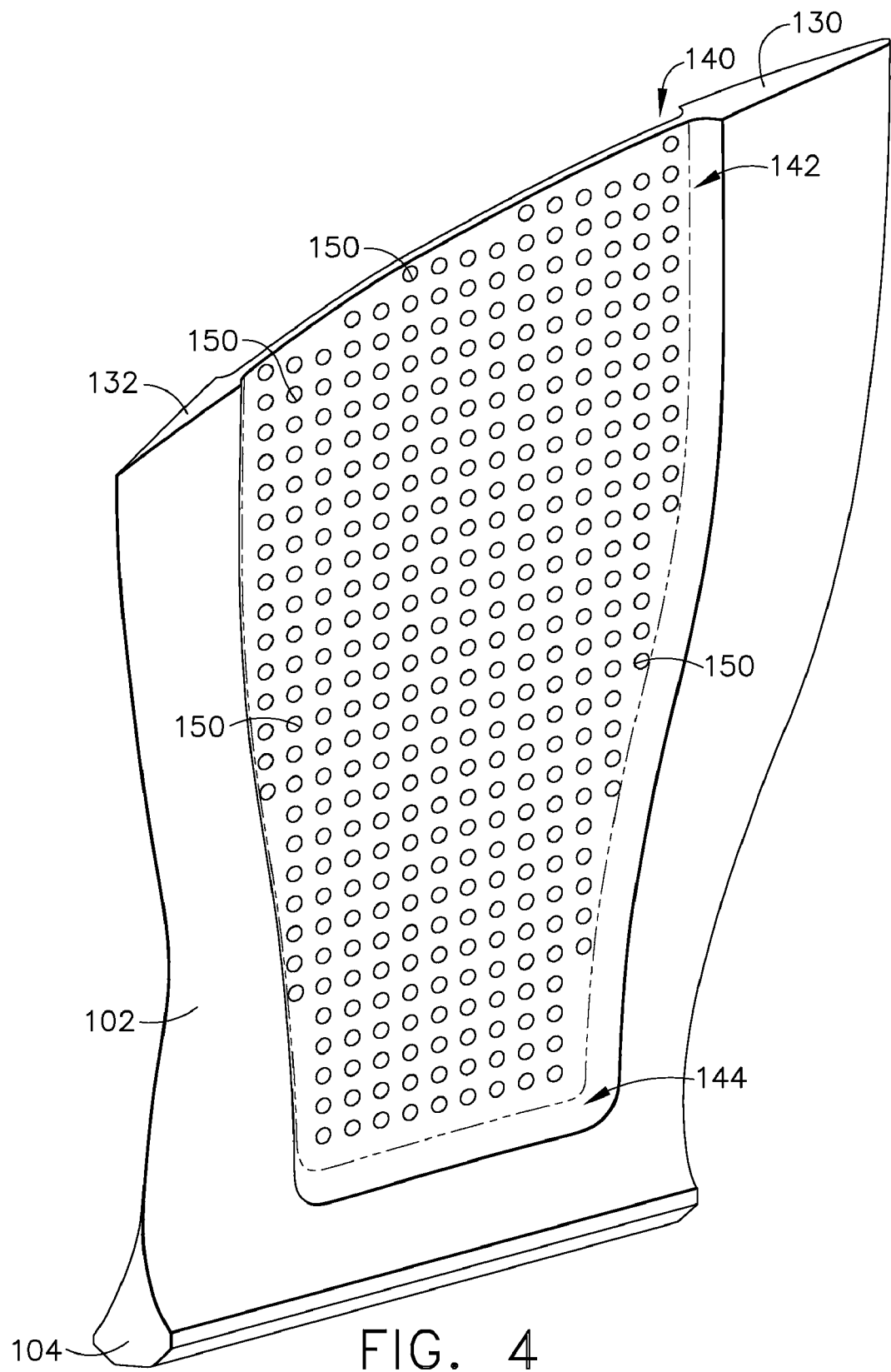
FIG. 4 is a perspective view of the rotor blade shown in FIG. 2 without the composite portion.

FIG. 2 is a perspective view of an exemplary rotor blade 100 that may be utilized with gas turbine engine assembly 10 shown in FIG. 1 including a composite portion 106. FIG. 3 is a top view of rotor blade 100 including composite portion 106. FIG. 4 is a perspective view of rotor blade 100 prior to coupling the composite portion 106 to rotor blade 100. Rotor blade 100 may be utilized within fan assembly 12, high pressure compressor 14, high pressure turbine 18, low pressure turbine 20 and/or multi-stage booster compressor 22. In the exemplary embodiment, rotor blade 100 is a fan blade that includes an airfoil 102 and an integral dovetail 104 that is used for mounting rotor blade 100 within gas turbine engine 10, and a composite portion 106 that is integrally formed with airfoil 102.

Airfoil 102 includes a first sidewall 110 and a second sidewall 112. In one embodiment, either first and/or second sidewalls 110 and/or 112 may be contoured to improve aerodynamic performance. In the exemplary embodiment, first sidewall 110 is convex and defines a suction side of airfoil 102, and second sidewall 112 is concave and defines a pressure side of airfoil 102. Sidewalls 110 and 112 are joined at a leading edge 114 and at an axially-spaced trailing edge 116 of airfoil 102. More specifically, airfoil trailing edge 116 is spaced chordwise and downstream from airfoil leading edge 114. First and second sidewalls 110 and 112, respectively, extend longitudinally or radially outward in span from an airfoil tip 118 to dovetail 104. In the exemplary embodiment, at least a portion of fan blade 100 is fabricated utilizing a metallic material such as, but not limited to, titanium.

As shown in FIGS. 2 and 3, airfoil 102 includes a substantially solid leading edge portion 130, a substantially solid trailing edge portion 132, and a connector portion 134 that is coupled between leading edge portion 130 and trailing edge portion 132 each fabricated utilizing a metallic material such as titanium, for example. More specifically, airfoil 102 has a profile that tapers outwardly from leading edge 114 at least partially towards trailing edge 116 and also tapers outwardly from trailing edge 116 at least partially towards leading edge 114. The profile then tapers inwardly from the leading edge portion to 130 to connector portion 134 and also tapers inwardly from trailing edge portion 132 to connector portion such that a first pocket 140 is defined in first sidewall 110 and a second pocket 142 is defined in second sidewall 112 to facilitate coupling composite portion 106 to airfoil 102.

As such, each pocket 140 and 142 has a depth 144 and composite portion 106 has a thickness 146 that is substantially equal to the pocket depth 144 such that when the composite portion 106 is coupled within pockets 140 and/or 142 airfoil 102 has an aerodynamic profile that is substantially smooth from the airfoil leading edge 114 to the airfoil trailing edge 116. That is, the composite portion 106 is substantially flush with the outer surfaces of both leading edge portion 130 and/or trailing edge portion 132.

To facilitate coupling composite portion 106 to airfoil 102, connector portion 134 has a plurality of openings 150 extending therethrough. In the exemplary embodiment, openings 150 are arranged in substantially parallel rows and columns to facilitate coupling composite portion 106 to airfoil 102 as will be discussed later herein.

Figure 5:
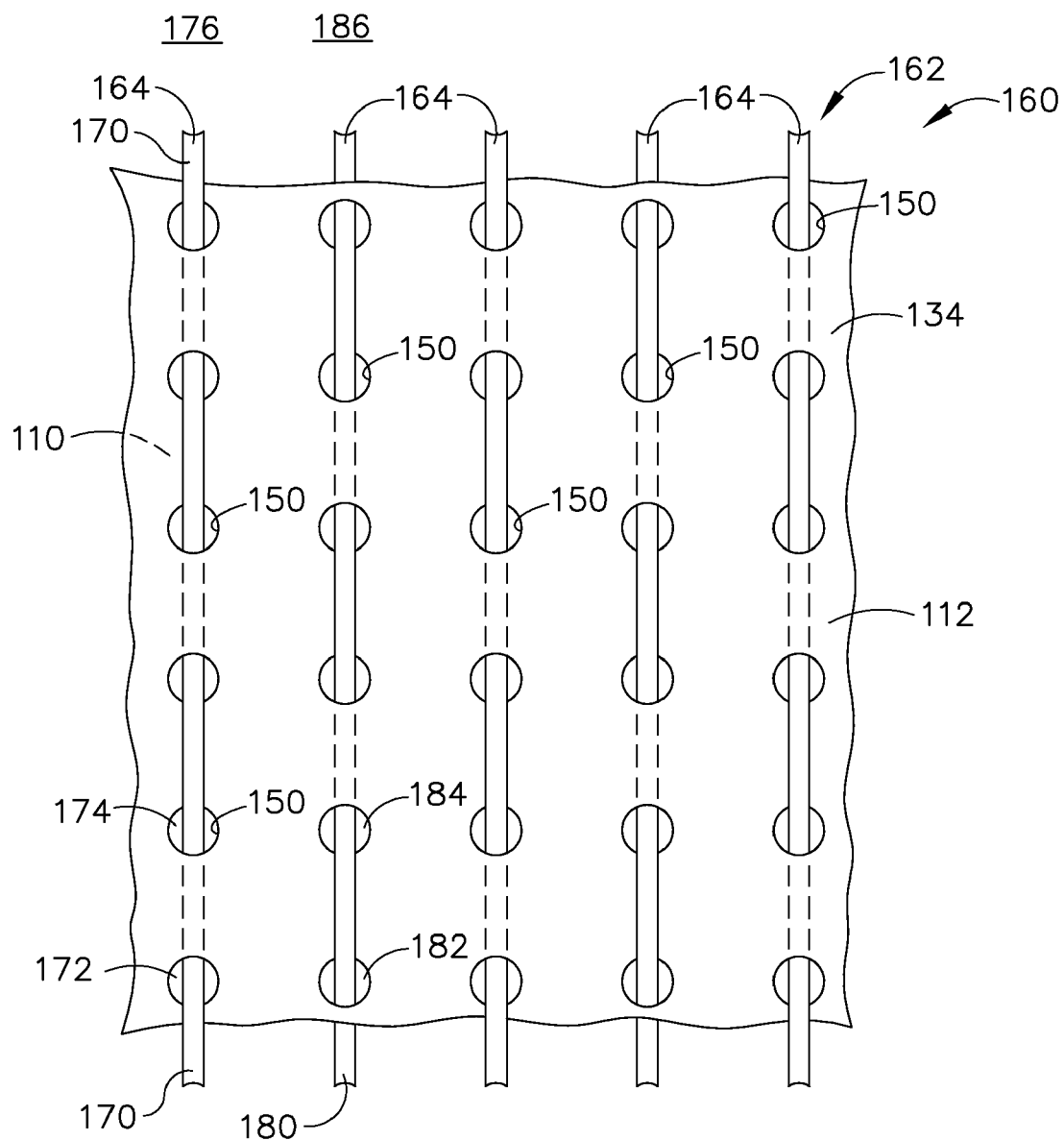
FIG. 5 is a side view of a portion of the rotor blade shown in FIG. 2 during an initial fabrication stage.

FIG. 5 is a side view of a portion of airfoil 102 shown during an initial fabrication stage. In the exemplary embodiment, composite portion 106 is fabricated utilizing a plurality of layers 160 of reinforcing fibers bonded together by a thermoset resin. For example, FIG. 5 illustrates a first composite layer 162 of composite material coupled to airfoil 102. Each layer 160 includes a plurality of fiber tows 164 that containing between approximately 10,000 an approximately 30,000 fibers per tow. Optionally, each fiber tow may include less than 10,000 fibers or greater than 30,000 fibers. Any suitable reinforcing fiber can be used to form fiber tows 164, including, but not limited to, glass fibers, graphite fibers, carbon fibers, ceramic fibers, aromatic polyamid fibers, for example poly(p-phenylenetherephtalamide) fibers (KEVLAR fibers), and mixtures thereof. Any suitable thermosetting polymeric resin can be used in forming each layer 160, for example, vinyl ester resin, polyester resins, acrylic resins, epoxy resins, polyurethane resins, bismalimide resin, and mixtures thereof.

As such, to fabricate airfoil 102 the plurality of fiber tows 106 are woven through the plurality of openings 150 extending through airfoil 102. More specifically, during the initial stage of fabrication, a first plurality of tows 164 are woven through plurality of openings 150 to form first composite layer 162. For example, and referring to FIG. 5, a first tow 170 is inserted through a first opening 172 such that a portion of first tow 170 is positioned on the first airfoil side 110. The first tow 170 is then inserted through a second opening 174 such that a portion of the first tow 170 is positioned on the second airfoil side 112. This procedure is repeated until the first tow 170 is woven through the first column 176 of openings 150. A second tow 180 is then is inserted through a first opening 182 such that a portion of second tow 180 is positioned on the second airfoil side 112. The second tow 180 is then inserted through a second opening 184 such that a portion of the second tow 180 is positioned on the first airfoil side 110. This procedure is repeated until the second tow 180 is woven through a second column 186 of openings 150. The remaining tows 164 are woven through the remaining columns of openings 150 in a similar fashion. As shown in FIG. 5, each tow 164 is woven through openings 150 in a staggered fashion, i.e. in alternating openings 150, in a substantially radial direction through airfoil 102.

Figure 6:
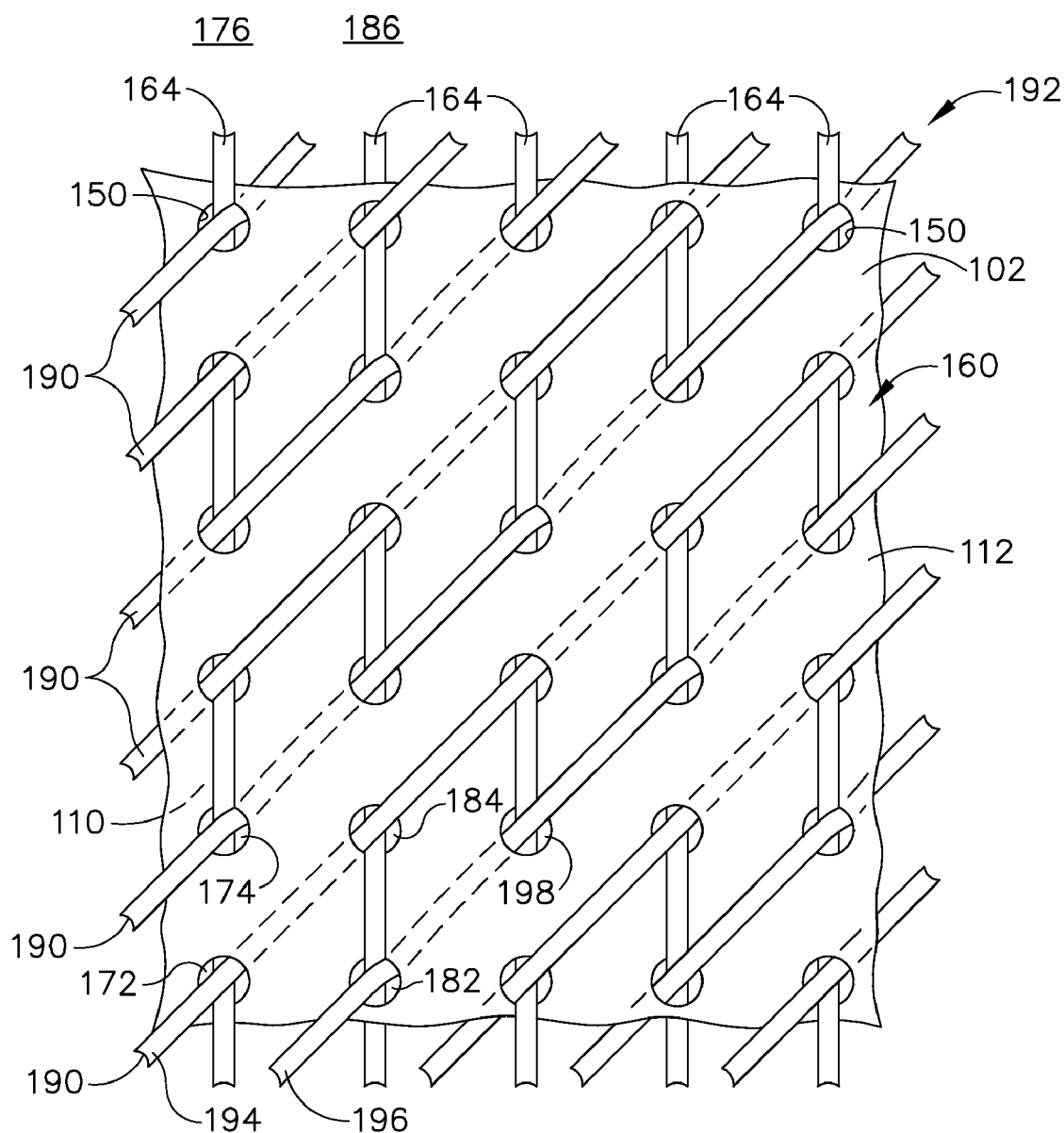
FIG. 6 is a side view of a portion of the rotor blade shown in FIG. 5 during a second subsequent fabrication stage.

FIG. 6 illustrates airfoil 102 during a second subsequent stage of fabrication wherein a second plurality of tows 190 are woven through plurality of openings 150 to form a second composite layer 192 wherein each tow 190 is woven through openings 150 at an angle that is approximately forty-five degrees to first plurality of tows 164. Specifically, each tow 190 is woven through openings 150 such that each tow 190 is diagonal to a respective tow 160 and therefore has both a radial and an axial component. For example, to fabricate second composite layer 192, a first tow 194 is inserted through first opening 172 such that a portion of first tow 194 is positioned on the first airfoil side 110. The first tow 194 is then inserted through opening 184 such that a portion of the first tow 194 is positioned on the second airfoil side 112. A second tow 196 is then inserted through opening 182 such that a portion of second tow 196 is positioned on the second airfoil side 112. The second tow 196 is then inserted through an opening 198 such that a portion of the second tow 196 is positioned on the first airfoil side 110. This procedure is repeated until the second tows 190 are each woven through successive rows and columns of openings 150.

Figure 7:
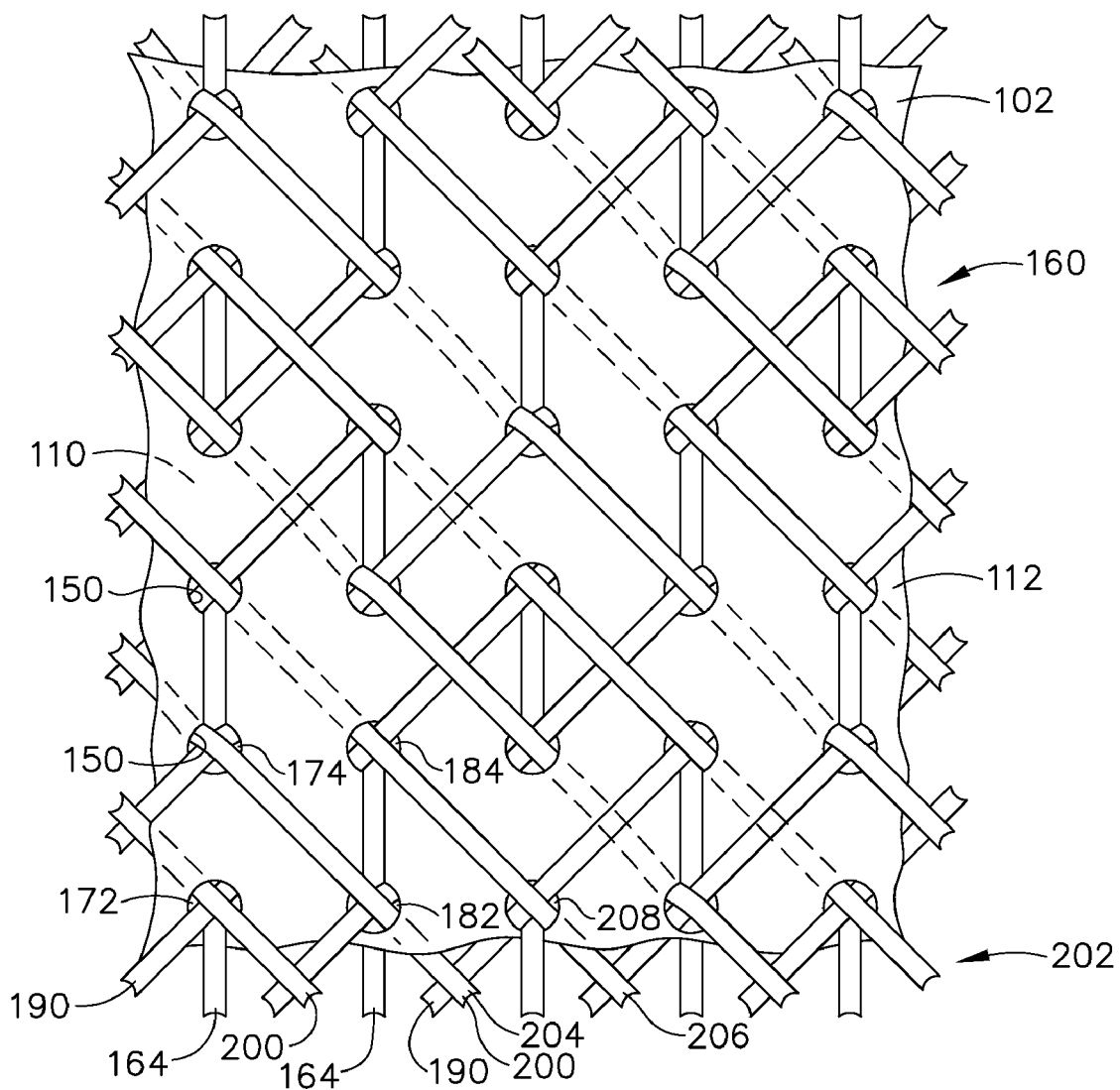
FIG. 7 is a side view of a portion of the rotor blade shown in FIG. 6 during a third subsequent fabrication stage.

FIG. 7 illustrates airfoil 102 during a third subsequent stage of fabrication wherein a third plurality of tows 200 are woven through plurality of openings 150 to form a third composite layer 202 wherein each tow 200 is woven through openings 150 at an angle that is approximately forty-five degrees to first plurality of tows 164 and approximately perpendicular to second plurality of tows 190. Specifically, each tow 200 is woven through openings 150 such that each tow 200 is diagonal to a respective tow 160 and therefore has both a radial and an axial component. For example, to fabricate third composite layer 202, a first tow 204 is inserted through opening 182 such that a portion of first tow 204 is positioned on the second airfoil side 112. The first tow 204 is then inserted through opening 174 such that a portion of the first tow 204 is positioned on the first airfoil side 110. A second tow 206 is then inserted through an opening 208 such that a portion of second tow 206 is positioned on the second airfoil side 112. The second tow 206 is then inserted through opening 184 such that a portion of the second tow 206 is positioned on the first airfoil side 110. This procedure is repeated until the second tows 200 are each woven through successive rows and columns of openings 150.

Figure 8:
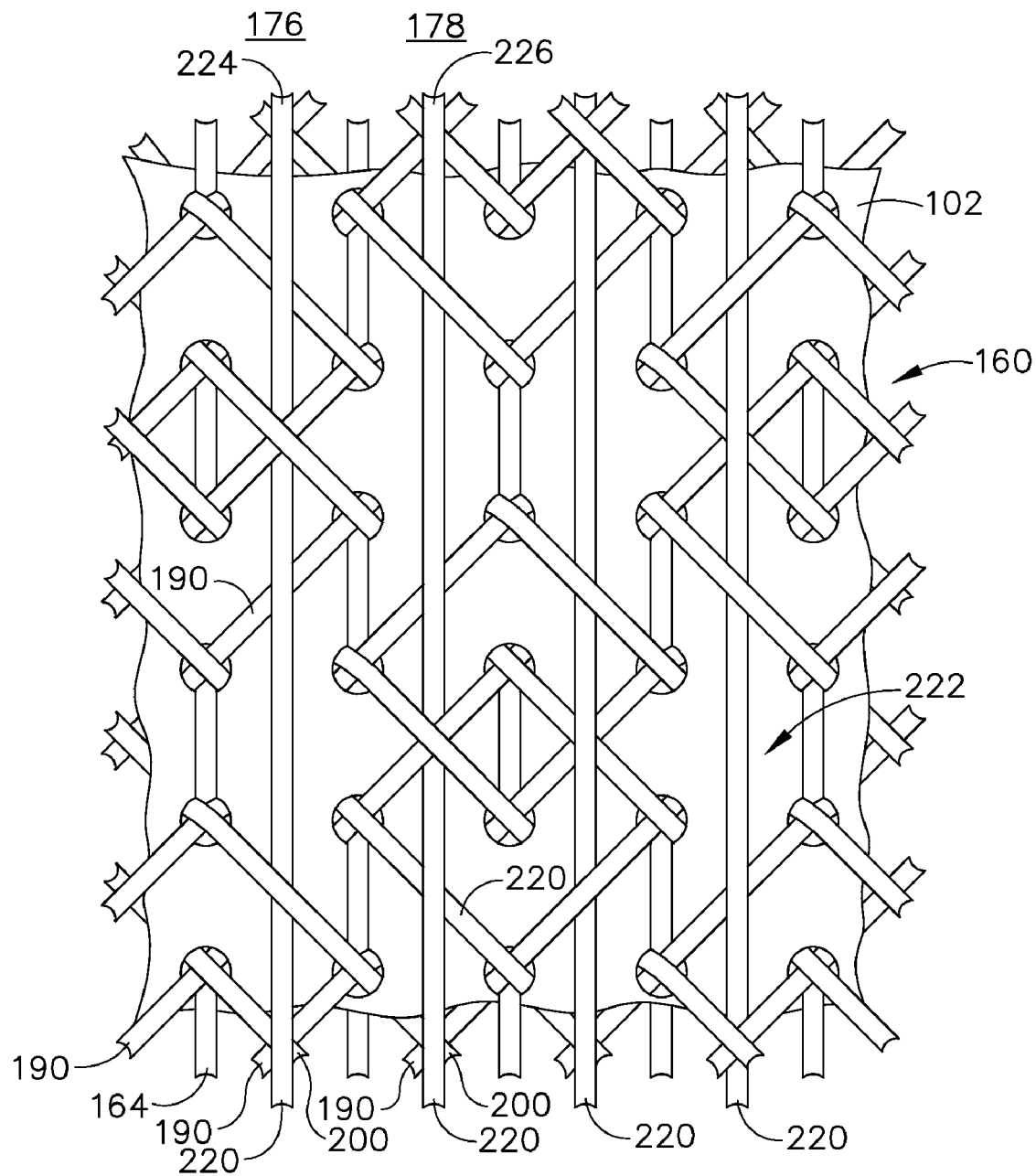
FIG. 8 is a side view of a portion of the rotor blade shown in FIG. 7 during a fourth subsequent fabrication stage.

FIG. 8 illustrates airfoil 102 during a fourth subsequent stage of fabrication wherein a fourth plurality of tows 220 are woven through tows 164, 190 and/or 200 to form a fourth composite layer 222 wherein each tow 220 is woven through portions of first, second, and third composite layers 162, 192, and/or 202 in a direction that is substantially parallel to first plurality of tows 164 and at an angle that is approximately forty-five degrees to second and third plurality of tows 192 and 202. Specifically, and as shown in FIG. 8, each respective tow 220 is not inserted through an opening 150 to facilitate coupling fourth composite layer 222 to airfoil 102. Rather, each respective tow 220 is woven through underlying composite layers. For example, to fabricate fourth composite layer 222, a first tow 224 is positioned over tows 190 and 200. First tow 224 is then inserted beneath tow 200 and again over tow 190. This pattern is then repeated for first tow 224 throughout column 176. A second tow 226, positioned in column 178, is then woven through and/or over tows 190, 200, and 220 for each respective remaining column on airfoil second side 112. Moreover, tows 220 are woven through and/or over tows 190, 200, and 220 for each respective remaining column on airfoil first side 110 (not shown in FIG. 8). As such, tows 220 are woven through tows and/or over tows 190, 200, and 220 on each respective side of the airfoil and as such are not inserted through openings 150.

Figure 9:
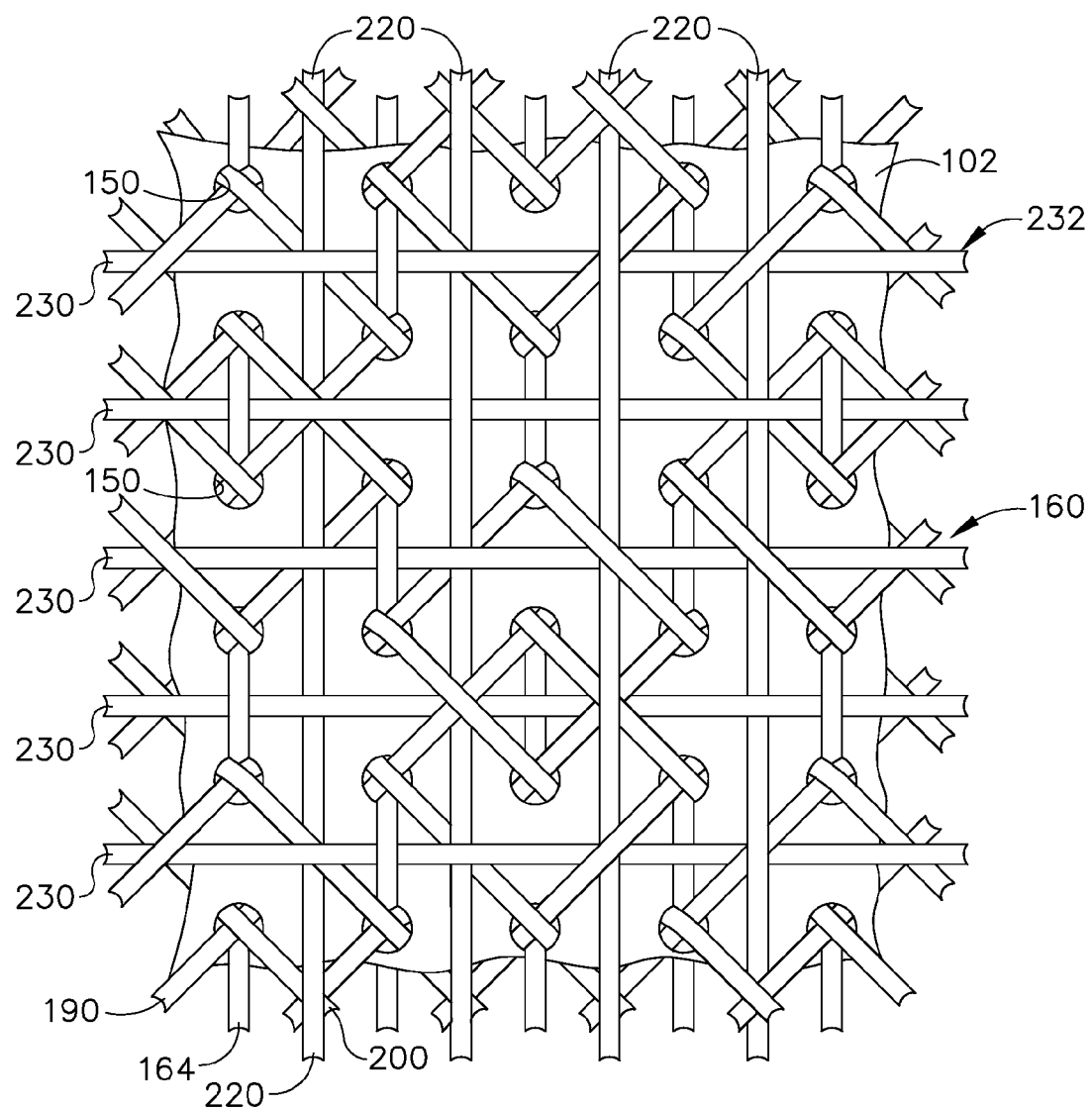
FIG. 9 is a side view of a portion of the rotor blade shown in FIG. 8 during a fifth subsequent fabrication stage.

FIG. 9 illustrates airfoil 102 during a fifth subsequent stage of fabrication wherein a fifth plurality of tows 230 are woven through tows 164, 190 200 and/or 220 to form a fifth composite layer 232 wherein each tow 230 is woven through portions of first, second, third, and fourth composite layers 162, 192, 202 and/or 222 in a direction that is substantially perpendicular to fourth plurality of tows 220 and at an angle that is approximately forty-five degrees to second and third plurality of tows 192 and 202. Specifically, and as shown in FIG. 9, each respective tow 230 is not inserted through an opening 150 to facilitate coupling fifth composite layer 232 to airfoil 102. Rather, each respective tow 230 is woven through underlying composite layers. For example, to fabricate fifth composite layer 232, tows 230 are woven through underlying tows 164, 190, 200 and/or 220 in a substantially axial direction, i.e. from leading edge 114 to trailing edge 116 between respective rows of openings 150. This pattern is then repeated for each respective tow 230 between each respective row of openings 150. Moreover, tows 230 are woven through and/or over tows 164, 190, 200 and/or 220 between each respective row of openings on airfoil first side 110 (not shown in FIG. 9). As such, tows 230 are woven through tows and/or over tows 164, 190, 200 and/or 220 on each respective side of the airfoil and as such are not inserted through openings 150.

To complete the fabrication of blade 100, the composite layers are bonded to airfoil 102 and to each other utilizing a thermoset material. The methods illustrated in FIGS. 5-9 may be repeated until the composite material 106 has a thickness 146 that is substantially equal to the pocket depth 144 such that when the composite portion 106 is coupled within pockets 140 and/or 142, airfoil 102 has an aerodynamic profile that is substantially smooth from the airfoil leading edge 114 to the airfoil trailing edge 116. That is, the composite portion 106 is substantially flush with the outer surfaces of both leading edge portion 130 and/or trailing edge portion 132.

Moreover, although FIGS. 5-9 illustrate an exemplary method of fabricating rotor blade 100 to include a composite material, it should be realized that the composite layers may be coupled to airfoil 102 in a variety of different methods without affecting the scope of the invention described herein. For example, although FIGS. 5-9 illustrate an exemplary method of weaving the composite layers through and/or over airfoil 102, it should be realized that a variety of weaving techniques may be utilized to form the composite layers on airfoil 102.

Described herein is an exemplary gas turbine engine rotor blade that includes a dovetail and an airfoil coupled to the dovetail. The airfoil includes a first side, a second side, and a plurality of openings extending therethrough. More specifically, the airfoil includes a leading edge portion, a trailing edge portion and a connector portion extending the leading edge and trailing edge portions. In the exemplary embodiment, the leading and trailing edge portions and the connector portion are fabricated utilizing a titanium material. The airfoil also includes a composite material that is woven through a plurality of openings extending through the connector portion and then permanently bonded to the airfoil using an adhesive or other suitable bonding agent.

More specifically, during fabrication the airfoil is machined and/or cast to include a first pocket that is defined in a first side of the airfoil and a second pocket that is defined in the second side of the airfoil. Thus the bottom of each respective pocket forms the connecting portion between the leading and trailing edge portions. The connector portion is machined or cast to include a plurality of openings that extend through the connector portion to enable a composite material to be woven to the airfoil. In the exemplary embodiment, the composite materials is woven to the airfoil using the plurality of openings. More specifically, the composite material includes a plurality of composite layers each including a plurality of composite fiber tows.

For example, a first plurality of fiber tows are woven to the airfoil to form the first composite layer, a second plurality of fiber tows are woven to the airfoil to form the second composite layer, etc. This process is repeated until the composite material has a thickness that is substantially equal to the depth of each sidewall pocket. A resin or epoxy is then applied to the plurality of composite layers to substantially permanently bond the composite layers to the airfoil. Moreover, the plurality of fiber tows in at least some of the individual composite layers are oriented in either a radial direction, an axial direction or a direction that has both a radial and an axial component. Orienting the fiber tows in this manner facilitates increasing the overall strength and durability of the composite material bonding to the metal surface.

During operation, the rotor blade fabricated utilizing the weaving process described herein provides, a relatively lightweight high strength rotor blade that resists damage. More specifically, the weaving process allows a composite material to be attached to or through the Ti skin. Since the structure could become locally disbonded under extreme conditions, the composite weave provides a redundant load path and mitigates any full disbond or loss of a relatively large piece of composite. Moreover, the method described herein allows for the incorporation of a solid thin leading edge for the airfoil thus maintaining the same high efficiency of a solid blade but utilizing a lighter construction and improved performance.

While the invention has been described in terms of various specific embodiments, those skilled in the art will recognize that the invention can be practiced with modification within the spirit and scope of the claims.

What is claimed is:

1. A method for fabricating a rotor blade for a gas turbine engine comprises:

fabricating a rotor blade that includes a dovetail and an airfoil coupled to the dovetail, the airfoil including a first side, a second side, and a plurality of openings extending therethrough; and weaving a composite material through the openings such that the airfoil has an aerodynamic profile that is substantially smooth from an airfoil leading edge to an airfoil trailing edge.

2. A method in accordance with claim 1 wherein fabricating a rotor blade further comprises:
fabricating a rotor blade that includes a dovetail and an airfoil coupled to the dovetail, the airfoil including a leading edge portion and a trailing edge portion;
coupling a connector portion between the leading and trailing edge portions such that a first pocket is formed in the first side, the plurality of openings extending through the first pocket to the second airfoil side; and
weaving the composite material through the openings such that airfoil has an aerodynamic profile that is substantially smooth from an airfoil leading edge to an airfoil trailing edge.

3. A method in accordance with claim 2 wherein fabricating a rotor blade further comprises:
fabricating the rotor blade to include a second pocket formed in the second airfoil side, the plurality of openings extending from the first pocket to the second pocket, and;
weaving the composite material through the openings such that airfoil has an aerodynamic profile that is substantially smooth from an airfoil leading edge to an airfoil trailing edge.

4. A method in accordance with claim 3 wherein the first and second pockets each have a depth, said method further comprising weaving a plurality of fiber tows through the openings to form a plurality of composite layers, the composite layers having a thickness that is approximately equally to the depth of the first and second pockets.

5. A method in accordance with claim 1 wherein weaving the composite material through the openings further comprises weaving a first plurality of fiber tows through the openings to form a first composite layer.

6. A method in accordance with claim 5 further comprising weaving a second plurality of fiber tows through the openings to form a second composite layer, wherein the second plurality of fiber tows are woven through the openings at an angle that is diagonal to the first plurality of fiber tows.

7. A method in accordance with claim 6 further comprising weaving a third plurality of fiber tows through the openings to form a third composite layer, wherein the third plurality of fiber tows are woven through the openings at an angle that is diagonal to the first plurality of fiber tows and approximately perpendicular to the second plurality of fiber tows.

8. A rotor blade for a gas turbine engine, said rotor blade comprising:
a dovetail;
an airfoil coupled to said dovetail, said airfoil comprising a first side, a second side, and a plurality of openings extending therethrough; and
a composite material woven through said openings such that said airfoil has an aerodynamic profile that is substantially smooth from an airfoil leading edge to an airfoil trailing edge.

9. A rotor blade in accordance with claim 8 wherein said airfoil further comprises a first pocket that is formed in said first side, said plurality of openings extending through said first pocket to said second airfoil side.

10. A rotor blade in accordance claim 9 wherein said airfoil further comprises a second pocket that is formed in said second airfoil side, said plurality of openings extending from said first pocket to said second pocket.

11. A rotor blade in accordance with claim 10 wherein said first and second pockets each have a depth and said composite material comprises a plurality of composite layers, each of said composite layers comprising a plurality of fiber tows.

12. A rotor blade in accordance with claim 11 wherein said plurality of composite layers have a width that is substantially the same as the depth of said first and second pockets such that said airfoil has an aerodynamic profile that is substantially smooth from said airfoil leading edge to said airfoil trailing edge.

13. A rotor blade in accordance with claim 11 wherein said composite layers comprise at least a first composite layer comprising a first plurality of fiber tows arranged in a first direction, and a second composite layer woven through said first composite layer, said second composite layer comprising a second plurality of fiber tows that are arranged in a direction that is different than said first plurality of fiber tows.

14. A rotor blade in accordance with claim 13 wherein said first and second plurality of fiber tows are each woven through said plurality of openings.

15. A rotor blade in accordance with claim 13 further comprising a third composite layer comprising a third plurality of fiber tows, said second plurality of fiber tows are woven through said openings at an angle that is diagonal to said first plurality of fiber tows, and said third plurality of fiber tows are woven through said openings at an angle that is diagonal to said first plurality of fiber tows and approximately perpendicular to said second plurality of fiber tows.

16. A gas turbine engine assembly comprising:
a fan rotor disk; and
a plurality of fan blades coupled to said fan rotor disk, at least some of said fan blades comprising
a dovetail;
an airfoil coupled to said dovetail, said airfoil comprising a first side, a second side, and a plurality of openings extending therethrough; and
a composite material woven through said openings such that said airfoil has an aerodynamic profile that is substantially smooth from an airfoil leading edge to an airfoil trailing edge.

17. A gas turbine engine assembly in accordance with claim 16 wherein said airfoil comprises an airfoil leading edge portion, an airfoil trailing edge portion, and a connector portion coupled between said leading and trailing edge portions, said plurality of openings extending through said connector portion.

18. A gas turbine engine assembly in accordance with claim 17 wherein said leading and trailing edge portions and said connector portion are fabricated utilized a metallic alloy.

19. A gas turbine engine assembly in accordance with claim 16 wherein said airfoil further comprises:
a first pocket that is formed in said first airfoil side; and
a second pocket that is formed in said second airfoil side;
said plurality of openings extending from said first pocket to said second pocket; said first and second pockets sized to receive a plurality of composite layers woven through said plurality of openings.

20. A gas turbine engine assembly in accordance with claim 19 wherein said composite layers comprise at least a first composite layer comprising a first plurality of fiber tows arranged in a first direction, a second composite layer woven through said first composite layer, said second composite layer comprising a second plurality of fiber tows that are arranged in a direction that is different than said first plurality of fiber tows.

* * * * *